(12) United States Patent
Ewer

(10) Patent No.: US 8,183,461 B2
(45) Date of Patent: May 22, 2012

(54) RACEWAY BRIDGE ASSEMBLY

(75) Inventor: Stephen R. Ewer, Milford, CT (US)

(73) Assignee: Hubbell Incorporated, Shelton, CT (US)

( * ) Notice: Subject to any disclaimer, the term of this patent is extended or adjusted under 35 U.S.C. 154(b) by 457 days.

(21) Appl. No.: 12/416,400

(22) Filed: Apr. 1, 2009

(65) Prior Publication Data

US 2010/0252298 A1 Oct. 7, 2010

(51) Int. Cl.
*H02G 3/04* (2006.01)

(52) U.S. Cl. ............ 174/68.3; 174/68.1; 174/72 A; 174/95; 174/481; 174/495; 174/503; 174/480; 285/120.1; 138/111; 138/116

(58) Field of Classification Search ........... 174/68.1, 174/68.3, 72 A, 95, 481, 495, 503, 480; 138/111, 138/116; 248/68.1; 285/120.1; *H02G 3/04*
See application file for complete search history.

(56) References Cited

U.S. PATENT DOCUMENTS

| | | | | |
|---|---|---|---|---|
| 686,052 | A * | 11/1901 | Golding | 174/97 |
| 4,163,572 | A * | 8/1979 | Benscoter | 285/284.1 |
| 4,366,341 | A | 12/1982 | van Riet | |
| 4,661,652 | A * | 4/1987 | Benscoter | 174/480 |
| 4,864,082 | A | 9/1989 | Ono et al. | |
| 4,891,471 | A * | 1/1990 | Ono et al. | 174/68.3 |
| 5,316,243 | A | 5/1994 | Henneberger | |
| 5,469,893 | A | 11/1995 | Caveney et al. | |
| 5,942,724 | A | 8/1999 | Russo et al. | |
| 6,143,984 | A * | 11/2000 | Auteri | 174/68.3 |
| 6,262,365 | B1 | 7/2001 | Ewer | |
| D474,750 | S | 5/2003 | Dyer et al. | |
| 6,756,539 | B1 * | 6/2004 | VanderVelde | 174/496 |
| 6,756,544 | B2 * | 6/2004 | Handler | 174/68.1 |
| 6,972,367 | B2 | 12/2005 | Federspiel et al. | |
| 7,045,707 | B1 * | 5/2006 | Galasso | 174/503 |
| 7,226,022 | B2 | 6/2007 | Bernard et al. | |
| 7,262,371 | B2 * | 8/2007 | Makwinski et al. | 174/481 |
| 7,964,796 | B2 * | 6/2011 | Suzuki | 174/72 C |
| 2003/0159846 | A1 * | 8/2003 | Takahashi et al. | 174/68.3 |
| 2003/0207602 | A1 * | 11/2003 | Handler | 439/215 |
| 2005/0217883 | A1 * | 10/2005 | Ewer et al. | 174/49 |
| 2008/0000669 | A1 * | 1/2008 | Galasso | 174/97 |
| 2010/0252298 | A1 * | 10/2010 | Ewer | 174/68.3 |

* cited by examiner

*Primary Examiner* — John K Kim

(74) *Attorney, Agent, or Firm* — Garrett V. Davis; Mark S. Bicks; Alfred N. Goodman

(57) ABSTRACT

A raceway bridge assembly is provided for carrying wires or cables over an intersecting raceway or other object without interfering with the intersecting raceway. The raceway bridge assembly includes a pair of opposing bridge fittings and a connecting raceway section extending between the raceway fittings. The bridge fittings have a first open end lying in a first plane and a second open end lying in a second plane spaced above said first open end. The bridge fittings have side walls that are coupled to a cover of a raceway section. A top wall is removably coupled to an upper edge of the sidewalls of the bridge fitting and is coupled to the connecting raceway section.

22 Claims, 4 Drawing Sheets

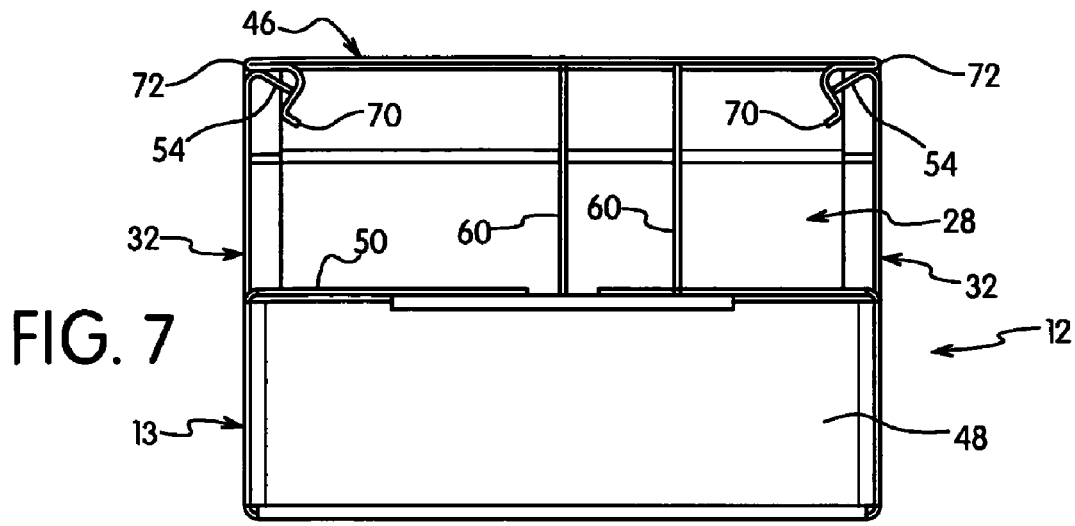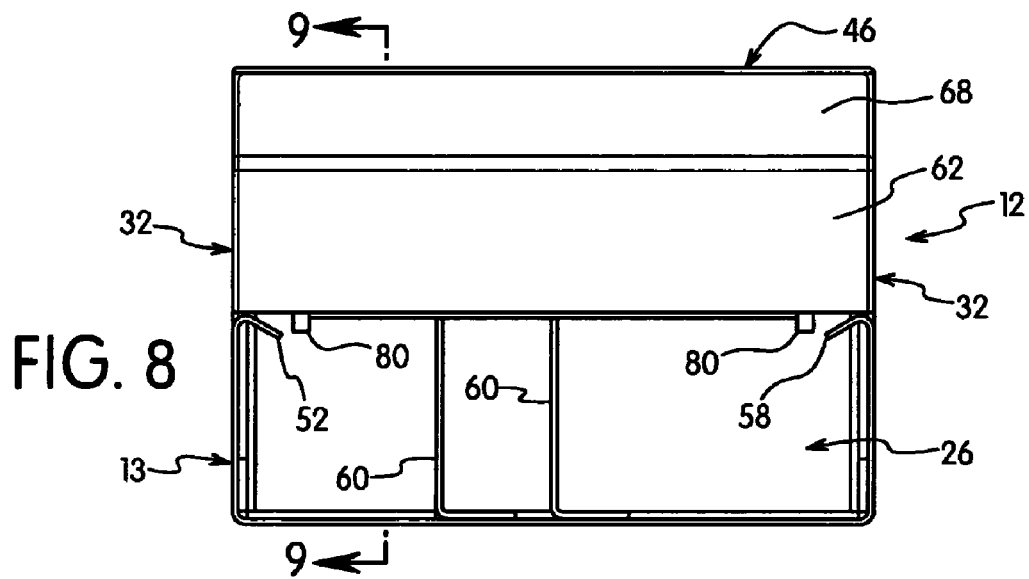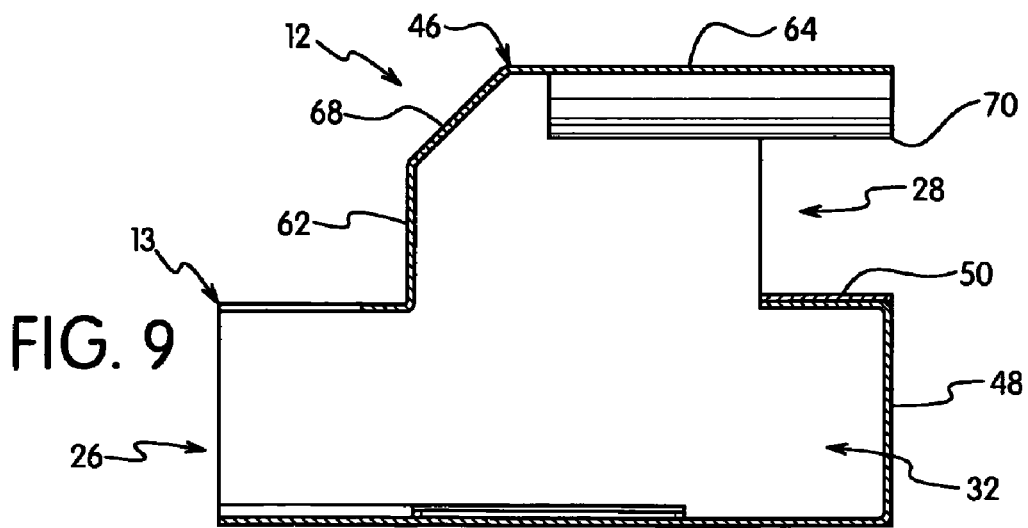

RACEWAY BRIDGE ASSEMBLY

FIELD OF THE INVENTION

The present invention is directed to a raceway bridge assembly constructed for crossing over an intersecting raceway carrying electrical wiring. More particularly, the invention is directed to a raceway bridge assembly having opposing bridge fittings and a variable length connecting raceway section extending between the bridge fittings.

BACKGROUND OF THE INVENTION

Cable raceways are commonly used in construction for enclosing and carrying electrical cables, data cables, fiber optic cables and/or wires along a supporting surface such as a wall or ceiling. Raceways typically include a housing or body having an appropriate length with an open top and a cover which can be attached to the housing by snap connectors or other coupling members. The housing of the raceways often include several internal walls or dividers defining multiple channels to separate various cables.

Raceways are generally manufactured in long straight sections which are cut to a desired length at the work site. Corner or angled sections are also manufactured for directing the raceway around corners or other changes in direction. In certain instances, more than one raceway may be installed at the work site for directing cables to different locations. In some situations, two or more raceways may intersect along the desired path so that it is necessary to reroute the raceways so as not to interfere with each other. One or more of the cable raceways often has to be interrupted or rerouted to avoid the intersecting raceways. Cable raceways may also intersect other objects on the wall or ceiling in the desired path such as conduits, pipes, beams or other support structures.

Various systems have been proposed for raceways to provide a bridge to allow one cable raceway to pass over a second cable raceway. One example is disclosed in U.S. Pat. No. 6,756,544 to Handler which discloses a bridge to enable the intersection of two raceways. The bridge is a one piece member that connects to two different raceway sections. The bridge includes a tunnel section extending transversely to the bridge to pass over intersecting the raceway while allowing the intersecting raceway to pass through the tunnel. The cables passing through the bridge pass over the tunnel and the intersecting raceway to prevent discontinuity of either raceway and to minimize electrical interference between the cables.

U.S. Pat. No. 5,942,724 to Russo et al. discloses a raceway for power and data communication wiring having a base with two forward open raceway channels that can be covered with cover segments which snap onto the base. The base forms a bridge which passes over an existing raceway. A cover snaps onto the base to close the top half of the base.

U.S. Pat. No. 4,163,572 to Benscoter discloses intersecting feeder ducts. A coupling member snaps onto the lower duct for supporting the upper duct which passes over the lower duct in an intersecting manner.

U.S. Pat. No. 6,262,365 to Ewer discloses a feed assembly to fit raceways having different cross sectional configurations. The ceiling feeder assembly has a first end for connecting to a first raceway which is mounted to a wall or other support surface. The assembly has an outlet at the opposite end which is elevated from the plane of the first raceway so that the cables can follow an inclined path from the first end to the second end.

The prior raceways and assemblies have generally been suitable for their intended purpose. However, there is a continuing need in the industry for an improved raceway assembly for two intersecting raceways.

SUMMARY OF THE INVENTION

The present invention is directed to a raceway assembly for enabling two raceways to intersect without disrupting the path of either raceway and without interference between the cables in the respective raceways. The raceway assembly of the invention is directed to a bridge assembly constructed for crossing over an intersecting raceway for carrying electrical wiring or cables. The present invention is particularly directed to a raceway bridge assembly having two opposing bridge fittings and a variable length connecting raceway section extending between the bridge fittings. The variable length connecting raceway section can be cut to any desired length to pass over the intersecting raceway or other object in the desired path of the raceway.

Accordingly, one aspect of the invention is to provide a raceway assembly that can pass over an intersecting raceway or other object regardless of the width of the object in the path of the raceway. Another aspect of the invention is to provide a raceway bridge fitting that can couple directly to an existing raceway and is compatible with standard raceway construction.

The bridge fittings of the invention can be connected to raceway sections to form steps to carry the cables to a different plane such as up or down a steep incline. The bridge fitting assembly can also be assembled to follow a recessed area in the floor, wall or ceiling.

Another aspect of the invention is to provide a bridge fitting for a raceway bridge assembly having a removable cover which is able to couple to the side walls of the raceway bridge and to the raceway section forming the connecting raceway passing over the intersecting raceway or obstacle.

A further aspect of the invention is to provide a bridge fitting for a raceway bridge assembly where the cover of a raceway section can couple directly to the bridge fitting.

The raceway bridge fitting of the invention forms a step adapted for carrying cables or wiring over an intersecting raceway or object. The raceway bridge fitting includes a first open end for connecting to a first raceway section that can be mounted to a wall or other support. The bridge fitting has a second open end spaced upwardly from the plane of the first open end so that the cables passing through the second open end are spaced further from the wall or support structure than the cables at the first open end. The second open end can be connected to a connecting raceway section for passing over the intersecting raceway or object. A second bridge fitting can be connected to the connecting raceway section to return the cables to the original level of the first raceway section where the second bridge fitting is connected to a second raceway section.

The various aspects of the invention are basically obtained by providing a bridge fitting adapted for carrying electrical wiring or cables from a first raceway over a second raceway intersecting the first raceway. The bridge fitting comprises a bottom wall having a first end, a second end and first and second side edges. First and second side walls extend upwardly from the first and second side edges of the bottom wall, respectively. A removable top wall is connected to the side walls to enclose the bridge fitting. The bridge fitting has a first open end adjacent the first end of the bottom wall and a second open end at the second end of the bottom wall where the second end is spaced upwardly from the bottom wall relative to the first open end.

The aspects of the invention are also obtained by providing a cable raceway assembly comprising a first bridge fitting having a first end and a second end and being adapted for carrying electrical wires or cables between the first end and the second end. The first bridge fitting has a bottom wall where the first end of the first bridge fitting is adjacent the bottom wall and the second end is spaced above the bottom wall. A second bridge fitting has a first end and a second end for carrying electrical wiring. The second bridge has a bottom wall with the first end being adjacent the bottom wall and the second end being spaced above the bottom wall relative to the first end. A connecting raceway section extends between the first and second bridge fittings and is removably coupled to the second end of the first and second bridge fittings.

The various aspects of the invention are also obtained by providing a raceway bridge assembly for crossing over an intersecting raceway where the raceway bridge assembly comprises a first raceway section, a second raceway section and a bridge assembly coupled to the first and second raceway sections for carrying electrical wiring over the intersecting raceway. The bridge assembly comprises a first bridge fitting having a first open longitudinal end in a first plane and a second open longitudinal end opposite the first open longitudinal end and lying in a second plane spaced from the first plane a distance at least equal to the height of the intersecting raceway. A second bridge fitting has a first open longitudinal end lying in a first plane and a second open longitudinal end lying in a second plane spaced from the first plane. The second bridge fitting is aligned with and opposing the first bridge fitting. A connecting raceway section having a length at least equal to a width of the intersecting raceway extends between the first and second bridge fittings. The connecting raceway section has a first end coupled to the second open end of the first bridge fitting and a second end coupled to the second open end of the second bridge fitting.

These and other aspects, advantages and salient features of the invention will become apparent from the following detailed description of the invention and the annexed drawings which disclose various embodiments of the invention.

BRIEF DESCRIPTION OF THE DRAWINGS

The following is a brief description of the drawings in which:

FIG. 7 is an end view of the raceway bridge fitting from the right side of FIG. 5;

FIG. 8 is an end view of the raceway bridge fitting as seen from the left side of FIG. 5;

FIG. 9 is a cross-sectional view of the raceway bridge fitting taken along line 9-9 of FIG. 8.

DETAILED DESCRIPTION OF THE INVENTION

The present invention is directed to a raceway bridge assembly for crossing over an intersecting raceway carrying electrical wiring or cables. In particular, the invention is directed to a raceway bridge assembly having opposing raceway bridge fittings at a variable length connecting raceway section extending between the bridge fittings. The raceway bridge assembly of the invention can also be used to cross over various objects in the path of the raceway and to traverse uneven surfaces such as humps or recesses in the support surface.

The raceway assembly of the invention is particularly adapted for carrying cables or wiring through channels which are able to pass over an existing obstacle or intersecting raceway.

Figure 1:
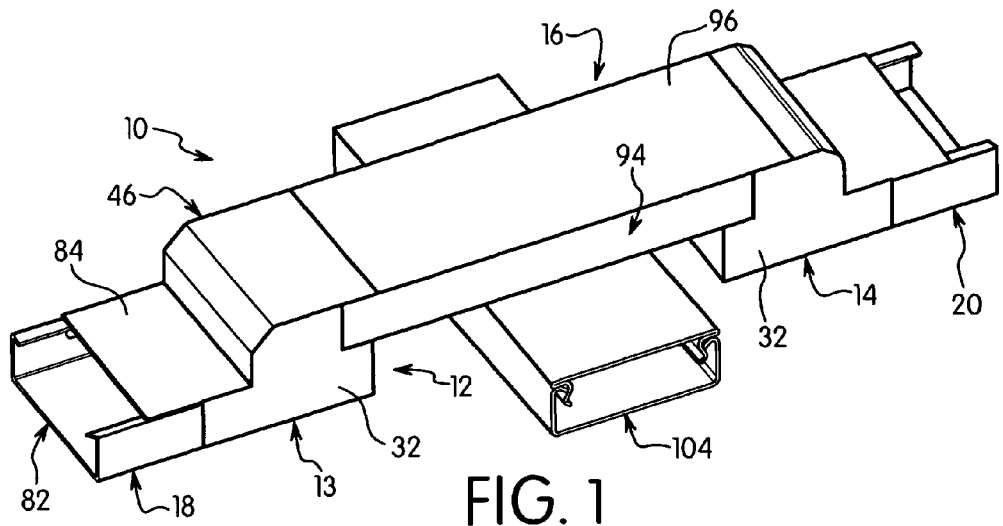
FIG. 1 is a perspective view of the raceway assembly in one embodiment of the invention showing the raceway fitting and the connecting raceway section extending therebetween.

Referring to the drawings, the invention is directed to a raceway bridge assembly 10 which includes bridge fittings 12 and 14 and a connecting raceway section 16 extending between bridge fittings 12 and 14. Bridge fitting assembly 10 as shown in FIG. 1 is adapted for crossing over an intersecting raceway or object of variable width. In the embodiment illustrated the ends of raceway bridge assembly 10 are connected to a first raceway section 18 and a second raceway section 20. Alternatively, one of the raceway bridge fittings can be connected to an electrical junction box supporting an electrical wiring device.

Figure 2:
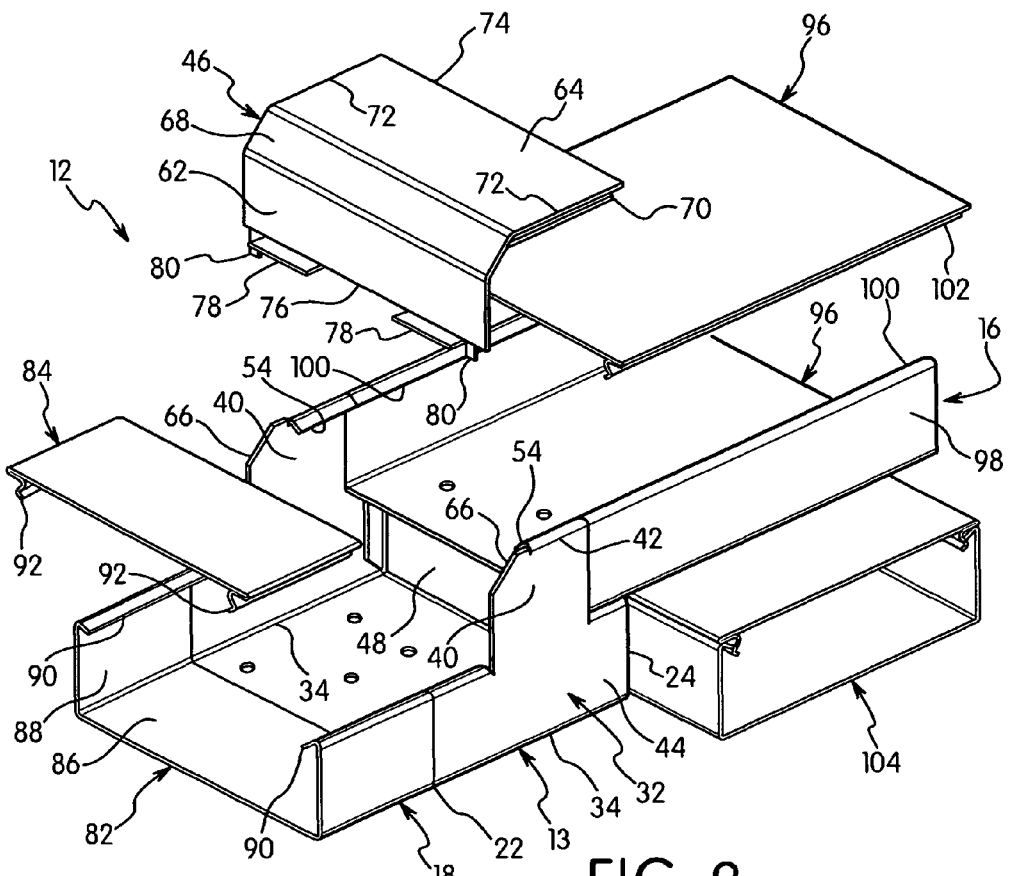
FIG. 2 is an exploded perspective view of the raceway fitting and the connecting raceway section.

Referring to FIGS. 1 and 2, bridge fittings 12 and 14 are substantially identical and are assembled with the connecting raceway 16 so that the ends of bridge fittings 12 and 14 opposed each other to form a bridge. In the following description bridge fitting 12 is discussed in detail although it will be understood that bridge fittings 12 and 14 are substantially identical and the corresponding parts are found in each bridge fitting. Referring to FIG. 2, bridge fitting 12 has a generally stepped shape having a first end 22 and a second end 24 which define a first open end 26 and second open end 28, respectively.

Figure 3:
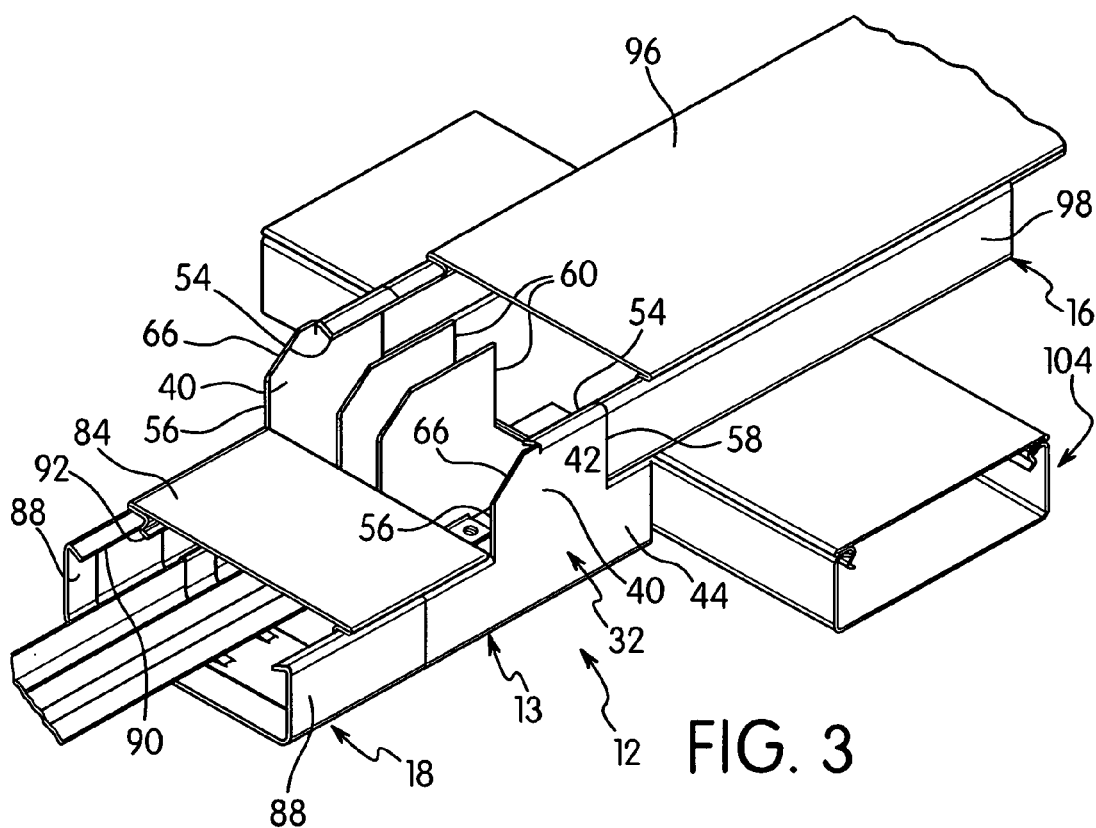
FIG. 3 is a perspective view showing the raceway assembly with the cover removed from the base of the raceway fitting.
Figure 4:
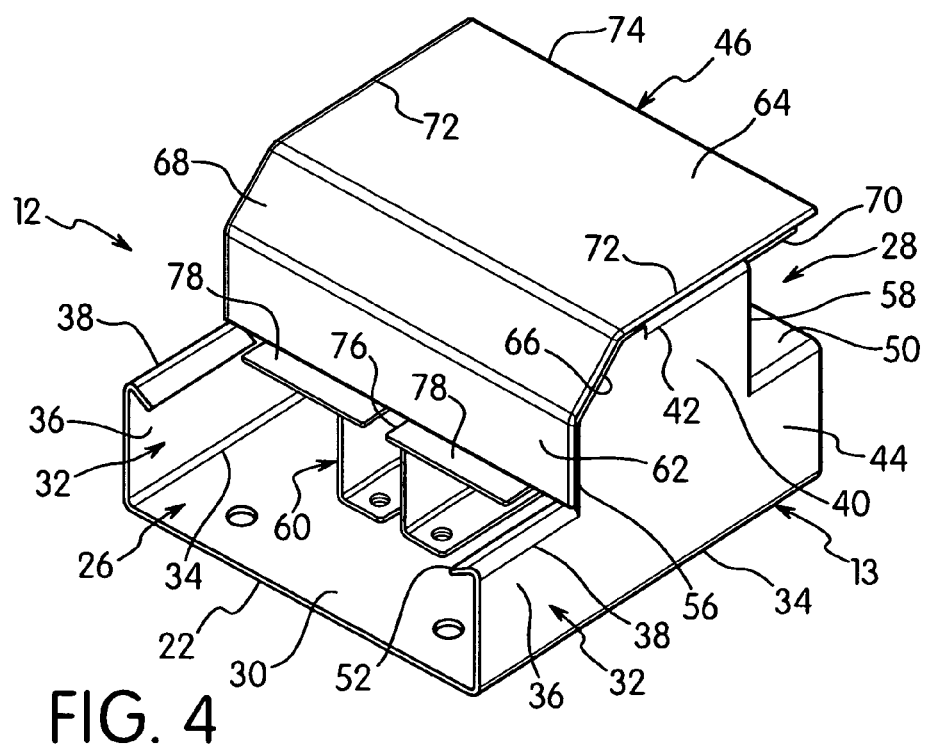
FIG. 4 is a perspective view of the raceway bridge fitting and cover.
Figure 5:
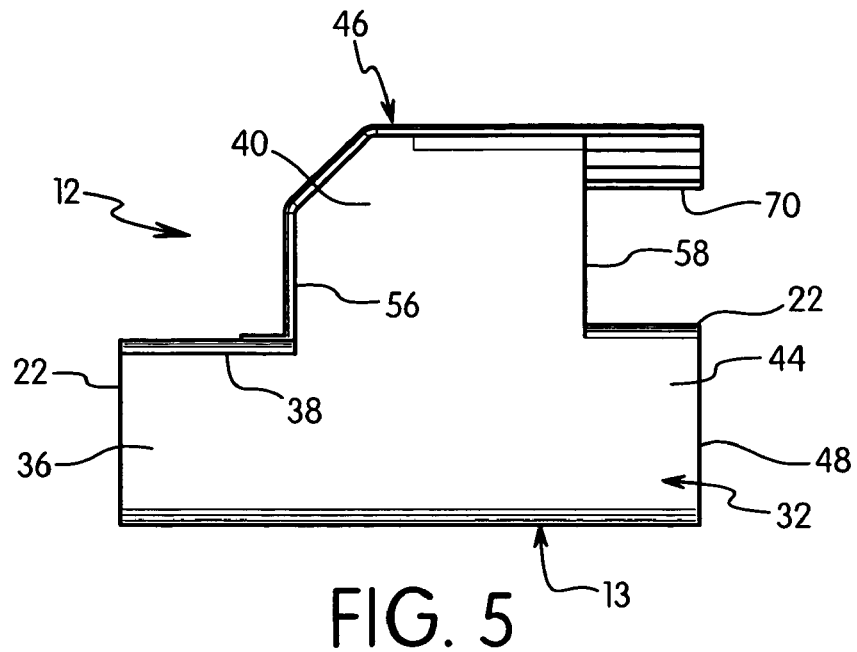
FIG. 5 is a side elevational view of the raceway bridge fitting and cover.

Bridge fitting 12 includes base 13 having a bottom wall 30 and opposite side walls 32. Side walls 32 extend upwardly from side edges 34 of bottom wall 30 as shown in FIGS. 2, 4 and 7. Side wall 32 has a first portion 36 at the first end 22 of bridge fitting 12 and has a top edge 38 extending in a longitudinal direction. A second middle portion 40 extends above first portion 36 and includes a top edge 42. A third end portion 44 of side wall 32 is formed at the second end 28 of bridge fitting 12 and adjacent the second middle portion 40. First portion 36 has a height corresponding substantially to the height of the body 82 of first raceway section 18 as shown in FIG. 3. In the embodiment illustrated, third end portion 44 has a height at least equal to the height of the raceway or object which is being crossed over by the bridge assembly 10. It will be understood that the two side walls are identical and mirror images of each other.

A cover 46 is removably coupled to side walls 32 to close the open top end of bridge fitting 12. In the embodiment illustrated, bridge fittings 12 and 14 are substantially identical so that identical parts are identified by the same reference number.

Second end 24 of bridge fitting 12 is closed by an end wall 48. A top wall 50 closes the upper portion of third end portion 44 of side wall 32 and extends from end wall 48 to the edge 58 of second middle portion 40. Top wall 50 extends between side walls 32 to define a step or ledge capable of supporting connecting raceway 16 as shown in FIG. 3. Second middle portion 40 of side wall 42 has a height extending above first portion 36 and third end portion 44 corresponding substantially to the height of the body of the connecting raceway 16.

Top edge 38 of first portion 36 of side wall 32 has a coupling member 52 adapted for coupling with a cover of the respective raceway section. In the embodiment shown, coupling member 52 is in the form of a downwardly extending lip or flange which is turned inwardly and downwardly with respect to sidewall 32. Top edge 42 of middle portion 40 of side wall 32 also has a coupling member 54. Coupling member 54 in the embodiment shown has the form of a downward turned lip or flange which is turned inwardly and downwardly.

Second middle portion 40 has a first edge 56 facing first end 22 of bridge fitting 12 and a second edge 58 facing second end 24 of bridge fitting 12. Second edge 58 of second middle portion 40 defines the second open end 24 of bridge fitting 12 to allow the passage of cables and wiring. As shown in FIG. 3, one or more dividers 60 can be mounted to bottom wall 30 to form a plurality of spaced apart channels for separating cables and wiring. Preferably, dividers 60 have a shape and dimension corresponding substantially to the shape and dimensions of side wall 32 as shown in FIG. 3.

Cover 46 has a width to extend between the opposing side walls 34 and is removably coupled to the top edge 42 of second middle portion 40. In the embodiment shown, cover 46 has a vertical portion 62 and a top horizontal portion 64. Vertical portion 62 has a height and shape corresponding to first edge 56 of middle portion 40 of side wall 32. In the embodiment illustrated, middle portion 40 has an inclined edge 66 which complements an inclined portion 68 of cover 46.

Figure 6:
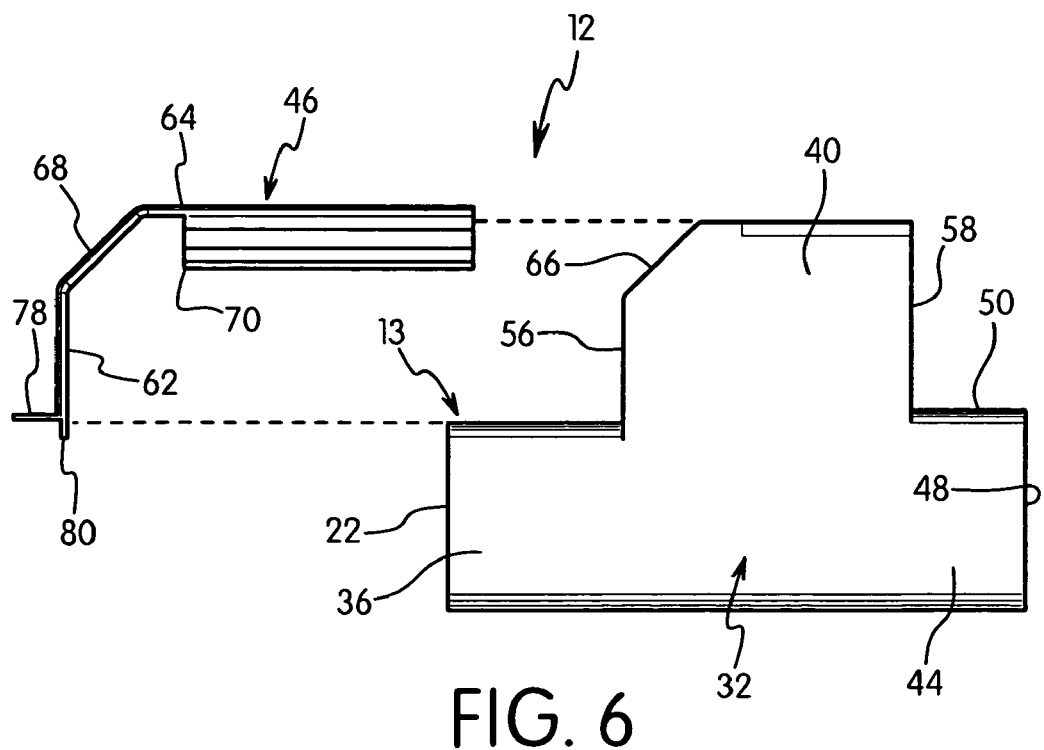
FIG. 6 is an exploded side view of the raceway bridge fitting.

Top portion 64 of cover 46 is provided with coupling members 70 along the opposite side edges 72. Each coupling member 70 is in the form of a curved flange having a substantially S-shape and which complements the coupling member 54 of middle portion 40. Coupling members 70 and 54 preferably provide a removable connection so that cover 46 can be installed to it and removed from bridge fitting 12. As shown in FIG. 6, cover 46 is aligned with middle portion 40 of side wall 32 and can slide or snap onto coupling member 54 of side wall 32. The S-shaped coupling members 70 have an inclined end 71 portion that is capable of engaging the coupling member 54. Coupling member 70 is sufficiently flexible to form a snap connection by applying a downward force onto a cover 64 toward the bridge fitting.

In one embodiment of the invention, top portion 64 of cover 46 has a length so that the end 74 aligns substantially with end wall 48. In this manner, the coupling member 70 of cover 64 is able to couple with connecting raceway section 16. In another embodiment shown in FIG. 1 with respect to bridge fitting 14, the top portion 64 has a length less than the width of middle portion 40 so that a portion of coupling member 54 of bridge fitting is exposed and available for coupling with the cover of the connecting raceway section 16.

Vertical portion 62 of cover 40 has a bottom edge 76 with at least one flange 78 extending substantially perpendicular to vertical portion 62 and parallel to top portion 64. As shown in FIG. 2, a downwardly extending tab 80 extends from bottom edge 76 adjacent the flange 78.

First raceway section 18 and second raceway section 20 are substantially identical and include a base 82 and a cover 84. Base 82 has a bottom wall 86 and side walls 88 forming an open top end. Side walls 88 have a coupling member 90 in the form of a downwardly and inwardly turned flange. Cover 84 in the embodiment illustrated has a substantially planar configuration with side edges having a downwardly extending coupling member 92 for coupling with coupling member 90 of base 82. Coupling member 92 is preferably the same as coupling member 70 having a substantially S-shape with sufficient flexibility and resilience to form a snap connection with the base 82 and the bridge fitting.

First and second raceway sections 18 and 20 are provided as separate units from the bridge assembly 10. The raceway sections are generally provided as a standard length and are cut to the desired length during installation. Bridge fittings 12 and 14 have a dimension and shape to complement the open end of the respective raceway section as shown in FIGS. 1 and 2. In a preferred embodiment, the side walls 88 of base 82 of the raceway section have a height corresponding to the height of the first end of side wall 32 of bridge fitting 12 such that the coupling members of side 32 of bridge fitting 12 are aligned with the coupling member of the raceway section. As shown in FIG. 1 and FIG. 3, cover 84 of raceway section 18 slides or snaps onto base 82 of the raceway section and onto the first portion 36 of side wall 32 of bridge fitting 12 for coupling the raceway section to the bridge fitting.

Connecting raceway 16 extending between bridge fittings 12 and 14 is substantially the same as first raceway section 18 and second raceway section 20. Connecting raceway 16 includes a body 94 and a cover 96 and can be cut to a desired length from the materials used for raceway sections 18 and 20. Body 94 has side walls 98 with a dimension complementing the second edge 58 of middle portion 40 of side wall 32 with a coupling member 100 which aligns with the coupling member 54 of side wall 32.

Coupling member 100 is substantially the same as coupling member 54. Cover 96 has coupling members 102 along the side edges which are substantially identical to coupling members 70 and 92. As shown in FIGS. 1-3, body 94 of connecting raceway 16 is supported on top wall 50 of bridge fitting 12 and bridge fitting 14. Connecting raceway 16 can be cut to a desired length during installation to cross over an intersecting raceway 104 or other object. Bridge fittings 12 and 14 have a height to support the connecting raceway 16 to pass over the intersecting raceway 104. As shown in the drawings, the first open end 26 of bridge fitting 12 lies in a first plane adjacent bottom wall 30 and extends in a longitudinal direction with respect to bridge fitting 12. The second open end 28 of bridge fitting 12 faces outwardly in the opposite direction and lies in a second plane spaced above bottom wall 30 and spaced above the plane of the first open end 26. The spacing between the first and second open ends are selected according to the dimensions of the raceway and the dimension of the intersecting raceway or other objects being traversed. Bridge fittings 12 and 14 are oriented so that the second open end face each other and coupled to the connecting raceway section.

Raceway bridge assembly 10 is assembled in a manner substantially shown in FIG. 1. The first bridge fitting 12 is positioned adjacent the first raceway section 18 and the second bridge fitting 14 is assembled adjacent the second raceway section 20. The connecting raceway section 16 is cut to length to extend between the second open ends of the respective bridge fittings. Wires or cables are then passed through the raceway sections and the bridge fittings to pass over the intersecting raceway 102. The respective cover 46 of the bridge fittings is then attached to the respective bridge fitting. As shown in FIG. 1, the top wall of the cover 46 can have a length to couple directly to the connecting raceway 16 for attaching the connecting raceway 16 to the bridge fitting. As shown in connection with bridge fitting 14 of FIG. 1, the cover of connecting raceway 16 can have a length to extend beyond the end of the connecting raceway body 94 and coupled directly to the coupling members of the bridge fitting 14. The cover members of the first and second raceway sections 18 and 20 can be coupled directly to the bridge fittings 12 and 14 as shown in FIG. 1.

The bridge fittings and raceway sections can be made of various suitable materials as known in the art. In one embodiment, the bridge fittings and raceway sections are made of metal such as steel or aluminum. Alternatively, the bridge fittings and raceway sections can be made of plastic or other suitable materials. The coupling members of the raceway sections and the bridge fittings can have other suitable shapes and dimensions that are capable of attaching the cover to the raceway sections and for attaching the cover of the bridge fittings to the respective bridge fitting. Suitable coupling members can include cooperating snap connectors or other fasteners.

While various embodiments have been chosen to illustrate the invention, it would be understood by those skilled in the art that various changes and modifications can be made without departing from the scope of the invention as defined in the appended claims.

What is claimed is:

1. A bridge fitting adapted for carrying electrical wiring from a first raceway over an object intersecting the first raceway, said bridge fitting comprising:
 a base having a bottom wall with a first end and a second end, and first and second side edges, first and second side walls extending upwardly from said first and second side edges of said bottom wall, respectively and having a top edge substantially parallel with said side edges, said side walls having an upwardly extending wall portion having a top edge spaced from the top edge of the side walls, and spaced from said second end to define an end portion having a top edge spaced below said top edge of said extending wall portion;
 an end wall at said second end and extending between said side walls; and
 a removable cover coupled to the side walls and having a top portion extending substantially parallel to said bottom wall and coupled to said top edge of said upwardly extending portion, said bridge fitting having a first open end adjacent said first end of said bottom wall and a second open end at said second end of said bottom wall and being spaced from said bottom wall.

2. The bridge fitting of claim 1, further comprising
 said first open end extending in a longitudinal direction with respect to said bridge fitting in a first direction and lying in a first plane, and said second open end extending in a longitudinal direction with respect to said bridge fitting in a second opposite direction and lying in a second plane spaced from said first plane.

3. The bridge fitting of claim 1, wherein said second open end is spaced from said first open end at height to carry the electrical wiring over an existing raceway.

4. The bridge fitting of claim 1, wherein said first and second side walls have a first coupling member for coupling with a raceway cover of the first raceway and communicating with said first open end of said bridge fitting.

5. The bridge fitting of claim 4, wherein said cover has a second coupling member on a bottom face thereof for removably coupling with said side walls of said bridge fitting and for coupling with a second raceway communicating with said second open end.

6. The bridge fitting of claim 5, wherein said bridge fitting has a top wall coupled to said side walls at said second end and spaced from said cover to define said second open end, and where said top wall is spaced from said bottom wall and has a dimension to support said second raceway communicating with said second open end.

7. The bridge fitting of claim 1, wherein
 said end wall has a height substantially the same as a height of said side walls.

8. The bridge fitting of claim 1, wherein
 said upwardly extending wall portion has a first end edge spaced from said first end and a second end edge spaced from said second end, said upwardly extending wall portions having a height greater than a height of said end wall.

9. The bridge assembly of claim 8, wherein
 said upward extending wall portion defines a first side wall portion at said first end and a second side wall portion at said second end having a top edge, said second open end being formed between a top edge of said end wall and said top edge of said upwardly extending wall portion.

10. A cable raceway assembly comprising:
 a first bridge fitting having a first open end and a second open end and adapted for carrying electrical wiring between said first end and second end, said first bridge fitting having a bottom wall, each of first and second side walls having a first upper edge for coupling with a first raceway cover, and a second upper edge for coupling with a bridge fitting cover of said first bridge fitting, said first open end being adjacent said bottom wall and said second open end being spaced above said bottom wall;
 a second bridge fitting having a first open end and a second open end and adapted for carrying electrical wiring, said second bridge fitting having a bottom wall, said first open end being adjacent said bottom wall and said second open end being spaced above said bottom wall; and
 a connecting raceway section extending between said first and second bridge fittings and being removably coupled to said second ends of said first and second bridge fittings.

11. The cable raceway assembly of claim 10, wherein said connecting raceway section is spaced from said bottom walls of said first and second bridge fittings a height sufficient to pass over an intersecting raceway.

12. The cable raceway assembly of claim 11, wherein said first and second bridge fittings have a removable bridge fitting cover.

13. The cable raceway assembly of claim 12, wherein said second bridge fitting has a pair of side walls, said side walls having a coupling member at an upper edge of a first end portion at said first end for coupling with a raceway cover of a raceway section communicating with said first open end.

14. The cable raceway assembly of claim 10, wherein said removable bridge fitting cover has a bottom face with coupling members for coupling with said side walls of said first bridge fitting and for coupling with side walls of said connecting raceway section.

15. The cable raceway assembly of claim 10, wherein each of said bridge fittings have an end wall at said second end, and having said second open end spaced above said end wall.

16. The cable raceway assembly of claim 15, wherein said connecting raceway section is supported on said end wall.

17. The cable raceway of claim 10, wherein
 said first and second side walls of said first bridge fitting have an upwardly extending wall portion having said second upper edge for coupling with said cover, and spaced between said first and second ends to define a first wall portion at said first end with said first upper edge, and a second wall portion at said second end and having a top edge for mating with a bottom edge of said connecting raceway.

18. The cable raceway of claim 10, wherein
said second bridge fitting has a first and second side wall with an upwardly extending wall portion defining a first upper edge and said side wall at said first end,
a second upper edge on said upwardly extending wall portion for coupling with a cover on said second cable raceway bridge fitting and a top edge of said side wall at said second end, and
said side walls of said first bridge raceway assembly having an upwardly extending wall portion spaced from said first end and spaced from said second end.

19. A raceway bridge assembly for crossing over an intersecting raceway, said raceway bridge assembly comprising a first raceway section, a second raceway section and a bridge assembly coupled to said first and second raceway sections for carrying electrical wiring over the intersecting raceway, said bridge assembly comprising:
a first bridge fitting having side walls extending upwardly from a bottom wall and having a first portion with an upper edge at a first end with a height to align with said first raceway section, and a second portion with an upper edge lying in a plane spaced from the upper edges of the first portion, a first open longitudinal end in a first plane, and a second open longitudinal end opposite said first open longitudinal end and lying in a second plane spaced from said first plane, said first and second open ends being spaced a distance at least equal to a height of the intersecting raceway, and said first bridge fitting having an end wall, said second open end being oriented above said end wall, and a removable cover coupled to upper edge of said second portion;
a second bridge fitting having side walls extending upwardly from a bottom wall and having a first portion with an upper edge at a first end with a height to align with said second raceway section, and a second portion with an upper edge lying in a plane spaced from the upper edges of the first portion, a first open longitudinal end in a first plane, and a second open longitudinal end in a second plane spaced from said first plane, said second bridge fitting being aligned with and opposing said first bridge fitting, and said second bridge fitting having an end wall, said second open end being oriented above said end wall, and removably cover coupled to said upper edge of said second portion; and
a connecting raceway section having a length at least equal to a width of the intersecting raceway, and extending between the second open ends and supported on the end walls of the first and second bridge fittings, said connecting raceway section having a first end coupled to said second open end of said first bridge fitting and a second end coupled to said second end of said second bridge fitting.

20. The raceway bridge fitting of claim 19, wherein
said first portion of said side walls have a coupling member at said upper end for coupling with a cover member of the first raceway.

21. A raceway bridge assembly for crossing over an intersecting raceway, said raceway bridge assembly comprising a first raceway section, a second raceway section and a bridge assembly coupled to said first and second raceway sections for carrying electrical wiring over the intersecting raceway, said bridge assembly comprising:
a first bridge fitting having opposite side walls extending upwardly from a bottom wall, a first open longitudinal end in a first plane, and a second open longitudinal end opposite said first open longitudinal end and lying in a second plane spaced from said first plane, said first and second open ends being spaced a distance at least equal to a height of the intersecting raceway, and an end wall at said second end, said second open end being oriented above said end wall and a removable cover removably coupled to an upper end of said side walls;
a second bridge fitting having opposite side walls extending upwardly from a bottom wall a first open longitudinal end in a first plane, and a second open longitudinal end in a second plane spaced from said first plane, said second bridge fitting being aligned with and opposing said first bridge fitting, and an end wall at said second end, said second open end being oriented above said end wall; and
a connecting raceway section having a length at least equal to a width of the intersecting raceway, and extending between the second open ends and supported on the end walls of the first and second bridge fittings, said connecting raceway section having a first end coupled to said second open end of said first bridge fitting and a second end coupled to said second end of said second bridge fitting and wherein each removable cover has a length to overlie said connecting raceway section and is coupled to said connecting raceway section.

22. The raceway bridge assembly of claim 21, wherein
said removable cover includes an upwardly extending portion extending between said upper edge of said first portion of said side walls and said upper edges of said second portion of said side walls, and a top portion extending in a longitudinal direction with respect to said bridge fitting.

* * * * *